Patented Mar. 13, 1934

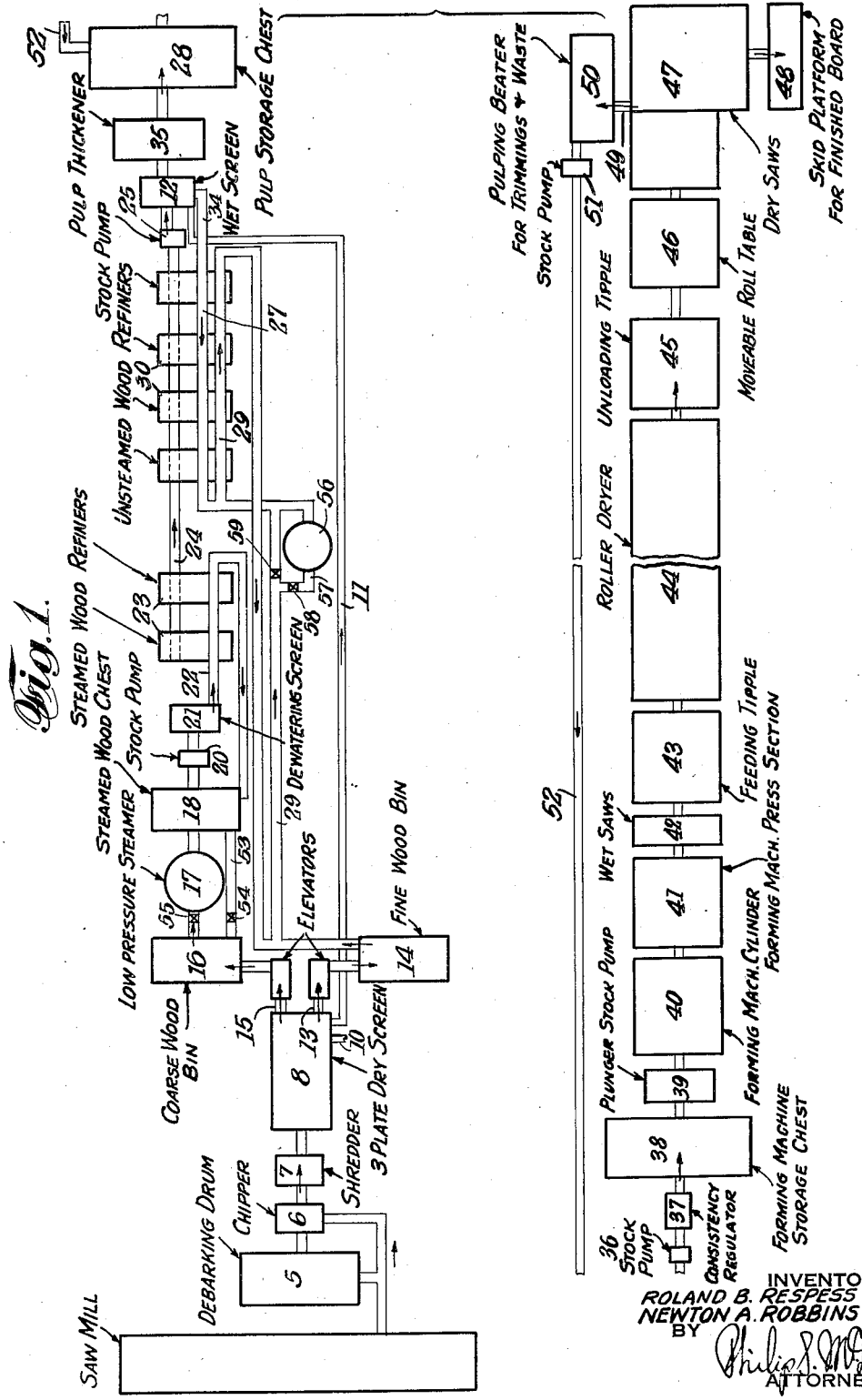

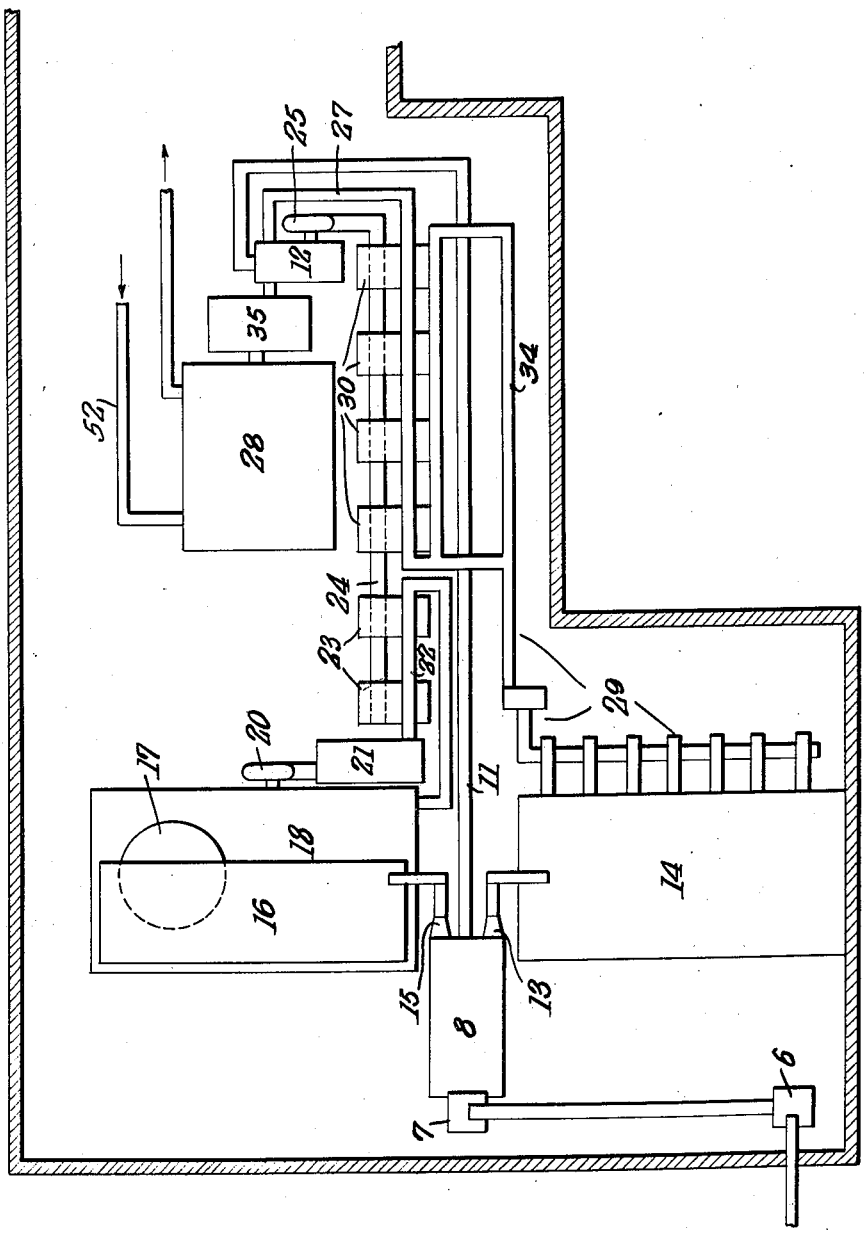

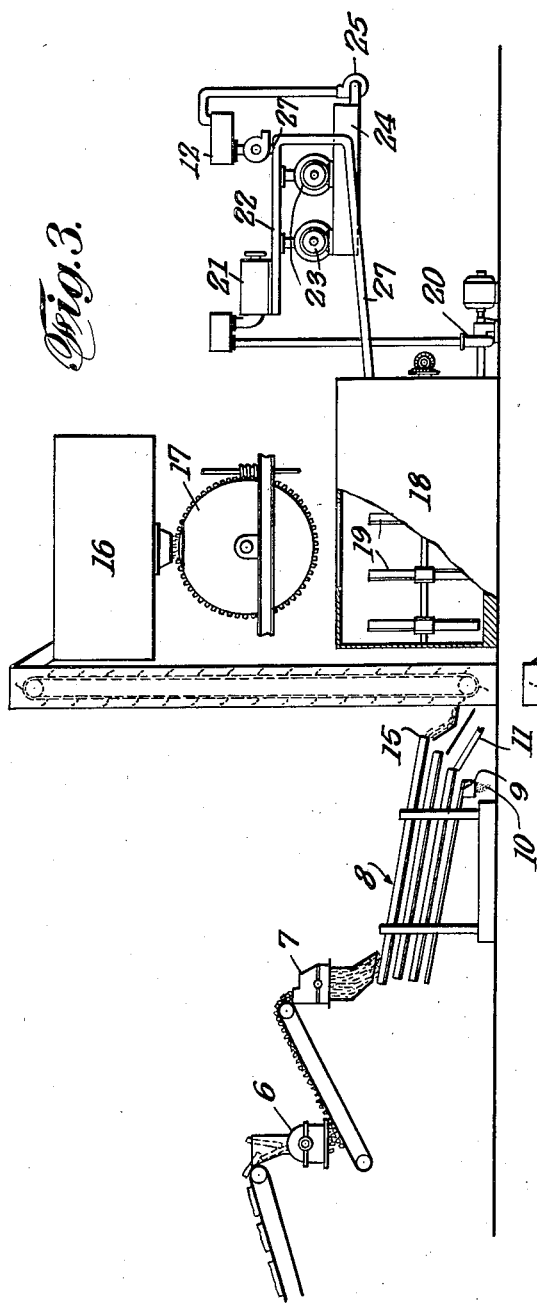
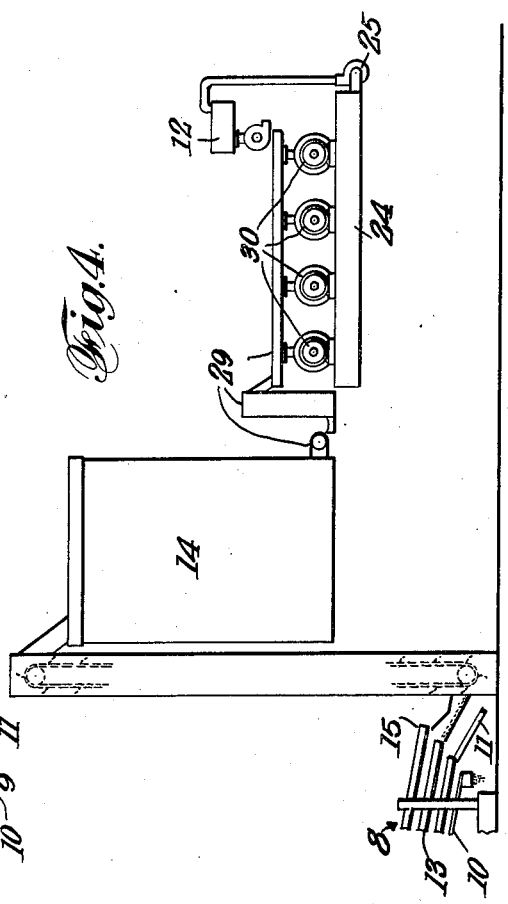

1,951,167

UNITED STATES PATENT OFFICE 1,951,167

CONTINUOUS PROCESS OF WALL BOARD MANUFACTURE

Roland B. Respess, Wickford, and Newton A. Robbins, Providence, R. I., assignors to Respats, Inc., Cranston, R. I., a corporation of Rhode Island Application January 4, 1933, Serial No. 650,156

15 Claims. (Cl. 92—20)

The present invention is a new process for the coordinated continuous production of insulating wall board, pressed hard board and other products which can be formed from comminuted fibrous vegetable material.

The invention will be illustrated and described as in the manufacture of insulating wall board from saw mill waste, but it will be understood that it is not intended thereby to limit the scope of the invention and further that the final steps of the process may be varied to produce other products, such as hard pressed sheets and articles produced by molding the reduced mixed fiber in desired shapes and varying densities and to include other fibrous vegetable matter that may be suited to the purpose.

It is known that in the operation of large saw mills, there is heavy waste in the reduction of tree trunks to lumber and that such wood waste for the most part, is a total loss.

Special objects of the present invention are to utilize such waste material and to handle the great volume of slabs, ends, trimmings, sawdust and bark constituting such material, continuously and with the greatest economy and least power consumption, attaining thereby successful and profitable production of useful and commercially valuable merchandise.

Further special objects are to utilize, so far as possible, machinery and equipment which has become more or less standardized and known in the treatment of wood fiber and manufacture of products therefrom, the present process being designed largely with this end in view.

Additional objects are to attain continuous operations which are entirely mechanical and economical in the use of power and which will apply to the use of all species of wood, particularly the southern pines that have a high rosin content and heretofore have not been reduced and used in the rate state for wall board and to secure classified grades and mixtures of fibers required for best results and retaining the natural strength and original gummy content, utilizing these to best advantage in the formation of insulating wall board or other products of predetermined dimensions, density, weight, strength and/or insulating qualities, at such reduced operating costs as will assure profitable production and sale of the product.

These purposes have been accomplished in the process disclosed and claimed in the companion Canadian patent application of Roland B. Respess, and in the United States patent application Ser. No. 586,729 issued as Patent 1,897,620, February 14, 1933 but the practice of that process requires the use of a special reducing mill of Respess design that is the subject of a pending United States patent application Ser. No. 586,728.

The present invention is similar in a general way to the above described process of the Respess patent applications first above referred to, but is distinguished therefrom in that the use of the special Respess reducing mill of the second referred to application and the subsequent steps of air separation are avoided and the classification of the fibers is accomplished in a pre-reduction step by step by dry screening of the shredded wood. The invention is further marked by the fact that standard equipment may be largely used in the carrying out of the new process and that all grinding and/or reducing operations of the chipped or shredded wood are conducted in the presence of free water.

In order that all features of the invention may be thoroughly understood, drawings are attached, forming part of this specification and illustrating a practical form of apparatus for the practise of the invention.

Fig. 1 is a "flow sheet" illustrating graphically the sequence of steps constituting the continuous process in the conversion of wood waste to wall board.

Fig. 2 is a broken plan view of part of the equipment corresponding to the flow sheet.

Fig. 3 is a broken part sectional side elevation of the apparatus for handling the coarser wood bulks.

Fig. 4 is a similar view of the apparatus for handling the finer wood bulks.

In the flow sheet, Fig. 1, the various portions of the apparatus was marked with appropriate titles, so that the action may be readily followed and reference characters are applied as follows:

The wood waste received from the mill is sorted and divided by selectively removing that part which is to be reduced to pulp and directing the remainder, which is suitable for fuel, to the power plant of the mill, or such other disposition as may be determined upon. The selected wood stock passes to the debarking drum 5, where bark and dirt are removed before passing on to the chipper 6. Clean trimmed wood need not pass through the debarking drum, being fed direct to the chipper.

After reduction in the chipper to suitable size, the wood passes on through a shredder 7, to a multiple plate dry screen indicated at 8.

The screen 8 is shown in the illustration as a 3-plate chip screen designed and connected to remove cut sawdust and the smaller particles, from the bed plate 9. Such material, being too fine for the present process may be sent back to the boilers or otherwise disposed of as indicated, at 10. The useful smaller fiber requiring no further treatment passes off the lower dry screen plate and may be conducted as indicated at 11 direct to the wet screen at 12. Under certain conditions, it may be desirable to combine this finished fiber with coarser fibers classified by the other screen plates and to pass the same along with such coarser bulks through subsequent reduction steps and accordingly, such possibilities come within the scope of this invention.

Continuing with the present illustration, the medium size finer bulks are directed from the second or middle screen plate 13 to the elevator and to fine wood bin 14. The larger or coarser bulks are directed from upper screen plate at 15, to the elevator and to coarse wood bin 16. The coarse and the medium size bulks thus separated are reduced by different treatments; the coarse usually by a method which may include steaming and the medium usually by a reduction without steaming.

The coarse shredded wood bin 16 is connected and arranged to deliver into a steaming chamber 17, or may by-pass the steaming chamber and deliver directly into a storage tank 18. Choice of either one of these steps is afforded by means of the by-pass connection indicated at 53 and the use of suitable valves or shut-off devices indicated at 54 and 55.

The steaming chamber 17 may be in the general form of a rotary digester and, for ordinary purposes, may be used simply to subject the bulks to a low pressure steaming treatment at a temperature and for a sufficient time to soften the wood without dissolving out or extracting the contained resins or saps. When steaming is completed, that is, when the shredded wood is softened, the steamed shredded wood may be dumped into the storage tank 18, which contains sufficient heated water for agitating and pumping purposes. Paddles may be provided for agitation as indicated at 19 in Fig. 3 and a stock pump is shown at 20, for transferring the shredded wood and water to a de-watering screen 21, which removes water and delivers the shredded material by the conveyor system 22, to one or more coarse wood refiners, such as attrition mills 23.

Steaming the fiber, while usually preferable, is nevertheless optional. In some cases cooking, and with or without chemicals, may be desirable and be employed. If steaming or cooking is not used, the shredded wood, by shutting off passage to the steamer or cooker at 55 and opening passage at 54 through the by-pass, may be passed from the dry screen or coarse wood bin to the storage chest 18, or direct to the refiners that are adjusted to treat this grade of unsteamed wood elements.

The refiners 23 reduce the shredded wood to pulp fibers long enough for the requisite elastic and strength-giving effect of the same in the wall board and deliver to a trough 24, to which is connected a pump 25, for carrying the pulp fibers to the wet screen 12. The latter separates and removes over-sized pulp fibers, returning them at 27, for a second pass through the refiners and delivers the properly reduced fibers to a pulp storage chest 28.

The finer shredded medium graded wood preferably and usually may not be steamed and is passed at 29, direct to the refiners 30, which convert the same into medium length pulp fibers and deliver to trough 24, from which pump 25 carries the stock to the wet screen 12. The latter passes the pulp fibers of proper size on to the pulp storage chest 28 and turns the over-size fibers back through conduit 34, for a second pass through refiners 30.

To permit steaming or cooking of the finer grade fibers, a steaming chamber such as indicated at 56, may be located in a by-pass 57 in the conduit 29 and be controlled by suitable valving means at 58, 59, so that it may be cut into or out of service, as required.

The storage tank 28 is equipped with suitable agitating means by which the three classified grades of pulp fibers delivered thereinto are circulated and thoroughly mixed. Furthermore, the different grades of fibers may be so proportioned and regulated as to furnish when compounded in the wall board, the requisite characteristics as to strength, flexibility, weight, mass, density, insulating qualities, etc. This proportioning can be regulated by controlling the shredding, dry screening and subsequent reduction of the material composing the three streams passing to the pulp storage chest. A suitable pulp thickener, such as indicated at 35, may be placed in the flow stream either before or after the pulp storage chest.

The mixture of predetermined correctly proportioned grades of fibers produced as above with the minimum power consumption and with the desired contents and attributes of the original wood can be readily converted directly into insulating wall board or other fibrous molded product and is shown herein as being passed from the pulp storage chest by a stock pump 36, through a consistency regulator 37, to a forming machine storage chest 38.

A plunger stock pump 39 is indicated for carrying the pulp from the forming machine storage chest 38 to the forming machine cylinder indicated at 40, which sheets the material and passes it on to the press section at 41 of the forming machine. Wet saws 42 operate on the sheeted stock to cut it as it passes to the feeding tipple indicated at 43. The roller drier 44, dries the stock to the form of dried, untrimmed board and the unloading tipple 45 passes this on to the movable roll table 46, which feeds to the dry saws at 47. Here the board is trimmed and the finished board is taken out on a skid platform 48. The trimmings pass, at 49, to a pulping beater 50, from whence a stock pump 51 returns the pulped trimmings and waste back through a conduit system 52 to the pulp storage chest 28.

The process is thus continuous from saw mill waste at one end through to finished wall insulating board at the other end. Apparatus of accepted standard form may be used practically throughout. By initially dividing the stock and treating it in separate grades, predetermined long and shorter fibers are obtained with a minimum of power consumption, in the shortest time, and without loss of the natural valuable elements of the wood, and the desired characteristics of the final product are readily provided and controlled. There is no waste of material, power or labor from the dry screen to the finished board, for even the trimmings from the dried board are immediately pulped and sent back to the pulp storage chest where they again combine with the newly mixed pulp. The water introduced in the system is used chiefly for conveyor purposes, so the water requirements are not excessive and such water as is required may be used over and over again. The process may be entirely mechanical but is so arranged as not to interfere with the use of chemicals if they be found desirable at any special or various stages in the operation, particularly such as may be found useful in the treatment of any special woods or in imparting certain additional qualities to the wall board or molded product, such as to make them fire-proof or give them greater density, etc.

For producing hard pressed board, the sheet material may be removed before reaching the drier or, after being partially dried in the drier and be subjected to heat and pressure in a multiple press or the like.

Other variations may be introduced in the practise of the invention, for example, both or all the coarser grades classified by the multiple dry screen may be steamed or cooked and with or without chemicals; or certain grades steamed and others cooked; or only certain grades steamed or cooked, such as in the example described, only the coarsest grade; the invention thereby differing from prior processes in which all the fibers were uniformly treated, by having different grades after classification differently treated and/or refined. By such choice of treatments, various effects are obtained not possible of attainment in the prior uniform treatment processes.

While a preferred mode of operation and form of apparatus have been here disclosed, it will be appreciated that changes in both the process and apparatus may be made, particularly to meet varying conditions and requirements of various products without departure from the true spirit and broad scope of the invention as here claimed.

What is claimed is:

1. The herein disclosed continuous, controlled and coordinated process for converting wood to pulp suitable for insulating wall board, which comprises successively chipping, shredding and dry screening the wood into classifications of finished and successively coarser grades, passing the finer finished fiber to a stock tank, separately refining each of the coarser grades by different treatments and controllably delivering predetermined grades of said separately refined pulp fibers to said same stock tank and thoroughly mixing the same with the fine finished fibers therein.

2. The herein disclosed continuous, controlled and coordinated process of converting wood to insulating wall board or the like, which comprises successively chipping, shredding and dry screening the wood into finished and successively coarser grades, passing the finer finished fiber to a stock tank, separately refining each of the coarser grades and controllably delivering predetermined grades of said separately refined pulp fibers to said stock tank and mixing the same with the fine finished fibers therein, sheeting said proportioned pulp mixture and pressing and drying the same to board form.

3. The herein disclosed continuous, controlled and coordinated process of converting wood to insulating wall board or the like, which comprises successively chipping, shredding and dry screening the wood into finished and successively coarser grades, passing the finer finished fiber to a stock tank, separately refining each of the coarser grades and controllably delivering predetermined grades of said separately refined pulp fibers to said stock tank and mixing the same with the fine finished fibers therein, sheeting said proportioned pulp mixture, pressing and partly drying the same and then pressing with heat to hard pressed board form.

4. The herein disclosed continuous, controlled and coordinated process of converting wood to insulating wall board or the like, which comprises successively chipping, shredding and dry screening the wood into finished and successively coarser grades, passing the finer finished fiber to a stock tank, separately refining each of the coarser grades and controllably delivering predetermined grades of said separately refined pulp fibers to said stock tank and mixing the same with the fine finished fibers therein, sheeting said proportioned pulp mixture and pressing and drying the same to board form, trimming the dried board, pulping the trimmings from said dried board and returning said trimmings pulp and mixing the same with the previously mixed stock from which the board was formed.

5. The herein disclosed continuous, controlled and coordinated process of converting wood to pulp suitable for insulating wall board, which comprises successively chipping, shredding and dry screening the wood into finished and successively coarser grades, passing the finer finished fiber to a stock tank, separately refining each of the coarser grades and softening by steaming one of said coarser grades during such refining and controllably delivering predetermined grades of said steamed and unsteamed separately refined pulp fibers to said stock tank and mixing the same with the fine finished fibers therein.

6. The herein disclosed continuous, controlled and coordinated process of converting wood to pulp suitable for insulating wall board, which comprises successively chipping, shredding and dry screening into finished and successive coarser grades, passing the finer finished fiber to a stock tank without steaming, separately refining and softening by steaming each of the coarser grades and controllably delivering predetermined grades of said separately refined steamed pulp fibers to said stock tank and mixing the same with the unsteamed fine finished fibers therein.

7. The herein disclosed continuous, controlled and coordinated process of converting wood to pulp suitable for insulating wall board, which comprises successively chipping, shredding and dry screening the wood into finished and successively coarser grades, passing the finer finished fiber to a stock tank, separately refining each of the coarser grades and softening by steaming the coarsest of said grades during such refining and controllably delivering predetermined grades of said steamed and unsteamed separately refined pulp fibers to said stock tank and mixing the same with the fine finished fibers therein.

8. The herein disclosed continuous, controlled and coordinated process for converting wood to insulating wall board, which comprises successively chipping, shredding and dry screening the wood into finished and successively coarser grades, passing the finer finished fiber to a tank, separately refining each of the coarser grades and steaming one of said coarser grades in the course of reducing the same and controllably delivering predetermined grades of said separately refined steamed and unsteamed fibers to said stock tank, mixing said steamed and unsteamed fibers with the fine unfinished fibers in said stock tank, sheeting said proportioned pulp mixture and pressing and drying the same to board form.

9. The herein disclosed continuous, controlled and coordinated process of converting wood to pulp suitable for insulating wall board, which comprises successively chipping, shredding and dry screening the wood into finished and successively coarser grades, passing the finer finished fiber to a stock tank, separately refining each of the coarser grades and cooking one of said coarser grades during such refining and controllably delivering predetermined grades of said cooked and uncooked separately refined pulp fibers to said stock tank and mixing the same with the fine finished fibers therein.

10. The herein disclosed continuous, controlled and coordinated process of converting wood to pulp suitable for insulating wall board, which comprises successively chipping, shredding and dry screening into finished and successive coarser grades, passing the finer finished fiber to a stock tank, separately refining and softening by cooking each of the coarser grades and controllably delivering predetermined grades of said separately refined cooked pulp fibers to said stock tank and mixing the same with the uncooked fine finished fibers therein.

11. The herein disclosed continuous, controlled and coordinated process of converting wood to pulp suitable for insulating wall board, which comprises successively chipping, shredding and dry screening the wood into finished and successively coarser grades, passing the finer finished fiber to a stock tank separately refining each of the coarser grades and cooking the coarsest of said grades during such refining and controllably delivering predetermined grades of said cooked and uncooked separately refined pulp fibers to said stock tank and mixing the same with the fine finished fibers therein.

12. The herein disclosed continuous, controlled and coordinated process for converting wood to insulating wall board, which comprises successively chipping, shredding and dry screening the wood into finished and successively coarser grades, passing the finer finished fiber to a tank, separately refining each of the coarser grades and cooking one of said coarser grades in the course of reducing the same and controllably delivering predetermined grades of said separately refined cooked and uncooked fibers to said stock tank, mixing said cooked and uncooked fibers with the fine unfinished fibers in said stock tank, sheeting said proportioned pulp mixture and pressing and drying the same to board form.

13. The herein disclosed continuous, controlled and coordinated process of converting wood to pulp suitable for insulating wall board or the like, which comprises successively chipping, shredding and dry screening the wood into finished and successively coarser grades, storing the finer finished fiber, separately refining each of the coarser grades and steaming at least one of said coarser grades in the course of separately refining the same and controllably proportionately combining and intermixing said separately refined steamed and unsteamed grade fibers with said stored finer finished fibers.

14. The herein disclosed continuous, controlled and coordinated process of converting wood to pulp suitable for insulating wall board or the like, comprising successively chipping, shredding and dry screening the wood into successively coarser grades, separately refining different grades by different selected modes of reduction and proportionately combining and intermixing said separately and differently refined grades of fibers.

15. The herein disclosed continuous, controlled and coordinated process of converting wood to pulp suitable for insulating wall board or the like, comprising successively chipping, shredding and dry screening the wood into successively coarser grades, separately refining different grades by different modes of reduction and including steaming of one grade and reduction without steaming of another grade and proportionately combining and intermixing said different and separately refined grades of fibers.

ROLAND B. RESPESS.
NEWTON A. ROBBINS.